United States Patent Office 3,530,134
Patented Sept. 22, 1970

3,530,134
DIBENZONAPHTHACRIDINES
Arnold Wick, Therwil, Switzerland, assignor to Ciba Limited, Basel, Switzerland, a Swiss company
No Drawing. Filed Dec. 27, 1966, Ser. No. 604,533
Claims priority, application Switzerland, Jan. 12, 1966, 358/66
Int. Cl. C07d 39/00
U.S. Cl. 260—274                    4 Claims

ABSTRACT OF THE DISCLOSURE

This invention relates to dibenzonaphthacridines of the formula

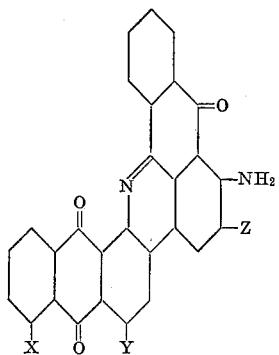

wherein X and Y are each hydrogen and Z is hydrogen or a sulfuric acid moiety. These compounds are useful as dyestuff intermediates.

---

The present invention provides dibenzonaphthacridines of the formula

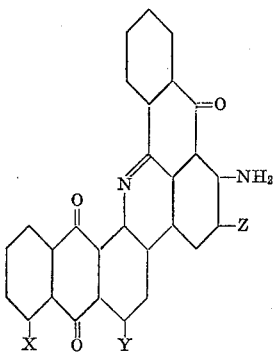

in which X and Y may be the same or different and each represents a hydrogen atom or a substituent and Z represents a hydrogen atom or a sulphonic acid group.

The present invention also provides a process for the manufacture of dibenzo-naphthacridines which comprises treating a mixture of a 1-aminoanthraquinone which is unsubstituted in the 2-position, and a 1-aminoanthraquinone-2-sulphonic acid, which is unsubstituted in the 4-position, advantageously a mixture which contains the above-mentioned components in a substantially stoichiometric ratio, with a Friedel-Crafts catalyst, and desulphonating the resulting product, if desired, by means of a reducing agent.

The 1-aminoanthraquinone which is unsubstituted in 2-position, to be used as starting substance, may have substituents in, for example, the 4-, 5-, 6-, 7- or 8-position. The 1-aminoanthraquinone-2-sulphonic acids which is unsubstituted in the 4-position, to be used together with these aminoanthraquinones, are preferably also unsubstituted in the 5- and 6- position.

As Friedel-Crafts catalysts there may be mentioned aluminium chloride, aluminium bromide, zinc chloride, tin tetrachloride, zirconium tetrachloride or titanium tetrachloride.

The reaction may, for example, take place in a melt of the reagents which have been mentioned, suitably in the presence of fluxes such for example as those which may also be used for carbazolisation reactions, and the extent to which these fluxes form molecular compounds with the Friedel-Crafts catalyst may be determined from case to case. As such fluxes there may be mentioned aromatic compounds for example, nitrobenzene, inorganic compounds, for example, sulphur dioxide, sodium bisulphite, sodium chloride, sodium fluoride, sodium bromide, amides, for example, urea and dimethylformamide, which may be used either by themselves or in mixtures with one another. Advantageous results are generally obtained when using aluminium chloride with the addition of a tertiary base, for example, a tertiary base which is free of hydroxyl groups, such for example, as triethylamine or dimethylamine. Cyclic bases, for example quinoline or acridine or especially pyridine or its immediate homologues, for example, methylpyridines, for example, α-picoline or mixtures of pyridine bases, for example, the technical β,γ-picoline mixture, are, however, especially suitable. Preferably at least one part by weight of the Friedel-Crafts catalyst is used per one part by weight of the mixture to be condensed. The ratio of the Friedel-Crafts catalyst and the flux is advantageously chosen so as to give a melt which can easily be stirred at a temperature of about 70° C. When pyridine bases are used a weight ratio of Friedel-Crafts catalyst to base is within the range of from 1:1 to 1:4 proves advantageous.

The reaction may optionally be carried out in the presence of a metal which acts as a catalyst, for example, nickel, iron, cobalt, chromium, manganese, sodium, magnesium, calcium, zinc, cadmium, aluminium, titanium, antimony, arsenic, bismuth, lead, tin, silver, gold, vanadium, tantalum, tungsten, zirconium, palladium or silicon or in the presence of a compound of such a metal, for example, a salt. Instead of the pure metals, metal, metal alloys may also be used, for example, aluminium-nickel, aluminium-cobalt, aluminium-iron, aluminium-copper, brass, bronze, cast iron, stainess steel, or Wood's alloy.

The reaction is advantageously carried out at elevated temperature, for example, at a temperature within the range of from 50° C to 150° C.

The resulting sulphonic acids may be worked up by introducing the reaction mixture into water, whereupon the sulphonic acid precipitates, optionally upon addition of salt, and may be isolated by filtration.

The sulphonic acids obtainable according to the process represent valuable dyestuff intermediates which are obtained in an especially simple manner by the process of the invention. From these, the sulphonic acid groups may be eliminated by treatment with reducing agents, for example, in an alkaline medium, and valuable dyestuff intermediates may be manufactured in this way.

The process is suitably carried out in such a way that a transient solution of the starting sulphonic acid is produced by simultaneous vatting. The reaction is especially advantageously carried out in ammoniacal solution in the presence of an additive which assists solution, such, for example, as an organic base, preferably ethanolamine, triethanolamine, pyridine or a pyridine base. Furthermore fine division of the starting material is of great importance and this is achieved by grinding or by directly carrying out the operation in a mill, for which the addition of dispersing agents has an advantageous effect.

Possible reducing agents are: thiourea dioxide, sodium dithionite, sodium borohydride, sodium sulphide, sodium hydrosulphide, rongalite, glucose and sulphinic acids.

The disulphonation is frequently coupled with a simultaneous purification, since the amino-derivative sometimes directly separates from the reducing bath in a crystalline form and impurities remain dissolved in the vat. Purification of the desulphonated amine by recrystallisation from dimethylformamide or sulphuric acid is also possible.

The substances free of sulphonic acid groups which are so obtained represent valuable intermediates for vat dyestuffs and pigment dyestuffs.

The following examples illustrate the invention, unless otherwise stated, the parts denote parts by weight, the percentages by weight, and the temperatures are given in degrees centigrade.

EXAMPLE 1

75 parts of 1-aminoanthraquinone-2-sulphonic acid in the form of an 87.5% strength sodium salt are introduced at 70° into a melt of 180 parts of anhydrous aluminium chloride and 600 parts of anhydrous pyridine, and stirred for 30 minutes at 70°. Thereafter 45 parts of 1-aminoanthraquinone are introduced during the course of 20 minutes and subsequently the temperature of the dark brown reaction mixture is raised to 80°, whereupon the colour changes towards olive brown. The melt is further stirred for 6 hours at 80–85° and after diluting with 200 parts of pyridine is poured into 1600 parts of 5 N caustic soda. The resulting suspension is freed of pyridine by means of steam, filtered after cooling, and the residue is washed with 2000 parts of 2% strength caustic soda and subsequently 0.5% strength sodium sulphate solution until neutral and is dried in vacuo at 80°. The crude product, which is obtained in good yield, may be directly further processed or may first still be purified by crystallisation. For this purpose the material is dissolved in 2400 parts of deionised water and 2400 parts of pyridine, with the addition of a little activated charcoal and kieselguhr, at the boil, and the mixture is filtered. The filter residue is rinsed with 400 parts of hot pyridine-water 1:1 and the hot filtrate is treated with a hot solution of 27 parts of sodium sulphate in 200 parts of deionised water. On cooling the sodium salt of 6-amino-5H,11H,16H-dibenzo-[c,mn]-naphtho-[2,3-h]-acridine - 5,11,16 - trione-7-sulphonic acid of formula

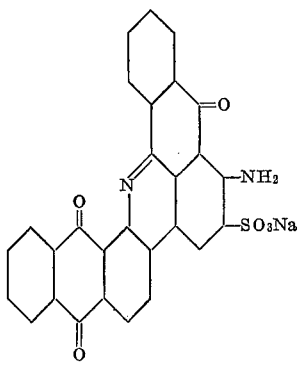

separates out in brownish orange small needles which are filtered off, washed three times with a little pyridine-water 1:10 and subsequently with deionised water until pyridine-free, and dried in vacuo at 80°.

The same product is also obtained if the two starting materials are simultaneously introduced, as an intimate mixture, at 80 to 85° into the pyridine/aluminium chloride melt and if the process is thereafter continued in accordance with the above data.

EXAMPLE 2

26 parts of the sulphonic acid obtained according to Example 1 are ground for 12 hours in a ball mill with 750 parts of pyridine, 750 parts of concentrated ammonia and 5 parts of the sodium salt of dinaphthylmethanedisulphonic acid. Thereafter 50 parts of technical grade sodium dithionite are added and the mixture further ground for 24 hours. The 6-amino-5H,11H,16H-dibenzo-[c,mn]-naphtho-[2,3-h]-acridine-5,11,16-trione of formula

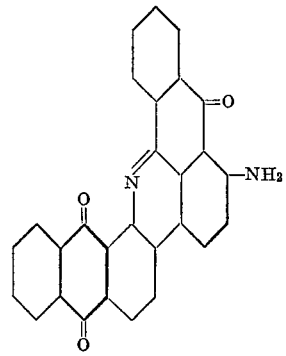

which separates out in fine reddish brown small needles is suction-filtered off the suspension which still has a reducing action, twice washed with 40 parts of pyridine-water 1:1 and subsequently with water until pyridine-free, and dried in vacuo at 80°. The reddish brown material obtained in good yield may for further purification be fractionally precipitated from sulphuric acid or may be recrystallised from dimethylformamide in the ratio of 1:70 to 1:80, whereupon woolly reddish brown small needles having a melting point above 350° are obtained. The product dissolves in concentrated sulphuric acid with a golden yellow colour; the expected molecular weight of 426 could be established by mass spectrometry.

What is claimed is:
1. A dibenzonaphthacridine of the formula

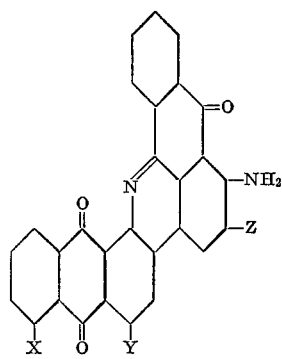

in which X and Y are each hydrogen and Z represents a member selected from the group consisting of a hydrogen atom and a sulfuric acid.

2. The dibenzonaphthacridine according to claim 1, wherein X, Y and Z are hydrogen atoms.

3. A compound of the formula

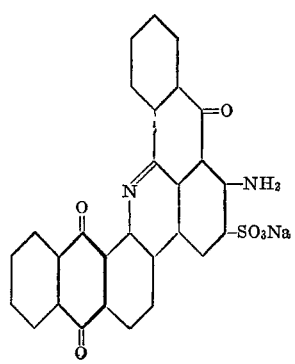

4. A compound of the formula
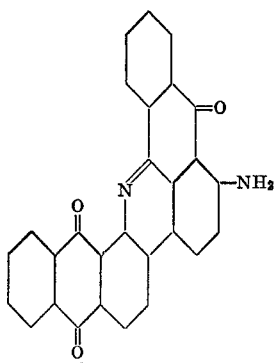
References Cited
UNITED STATES PATENTS
2,416,931 3/1947 Lecher et al. _____ 260—316
2,901,479 8/1959 Baumann et al. _____ 260—274
3,471,524 10/1969 Wick _____ 260—367
OTHER REFERENCES
Wick et al.: in Chem. Abstr., vol. 66, col. 28636y (1967).
DONALD G. DAUS, Primary Examiner
U.S. Cl. X.R.
260—367, 372